Aug. 5, 1941.  A. G. H. CARLBOM  2,251,267
VARIABLE LEVERAGE BRAKE
Filed April 4, 1940   3 Sheets-Sheet 1
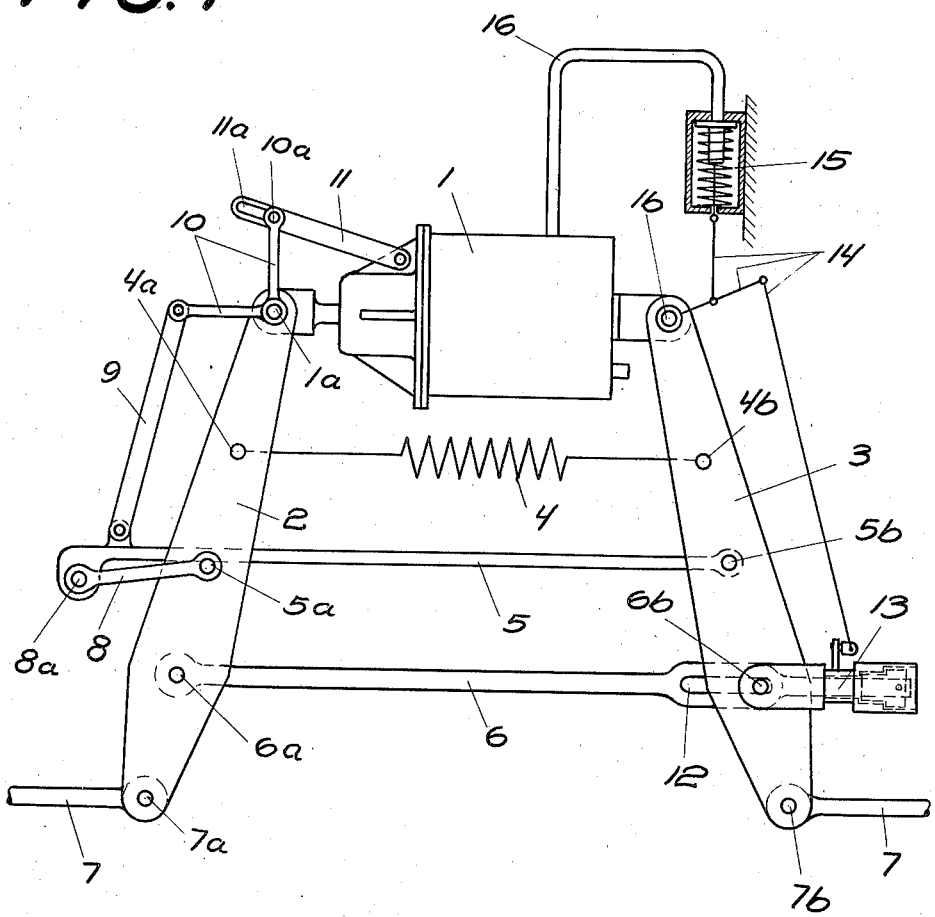

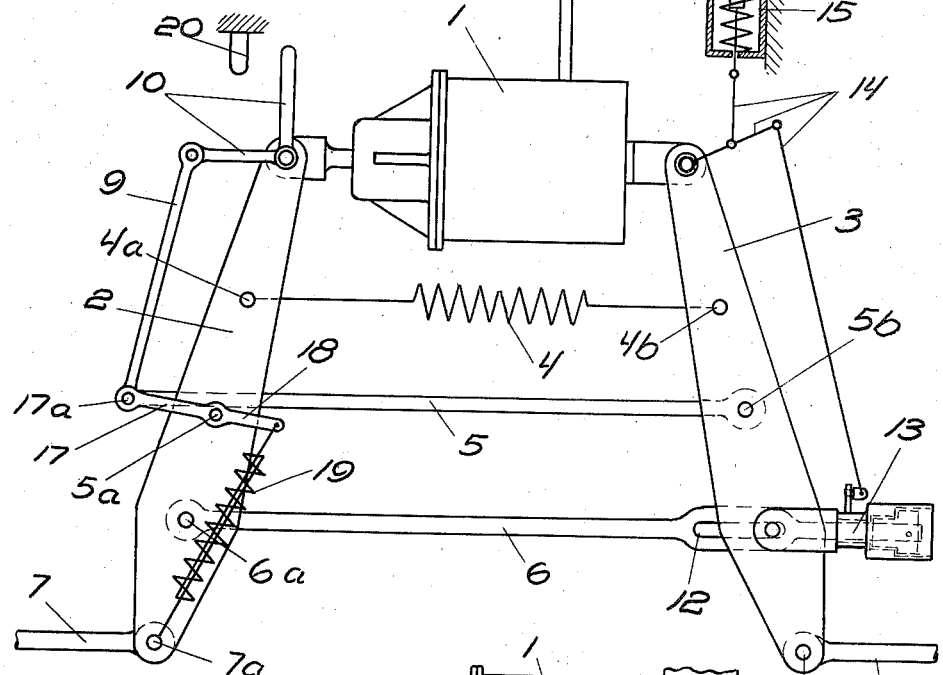
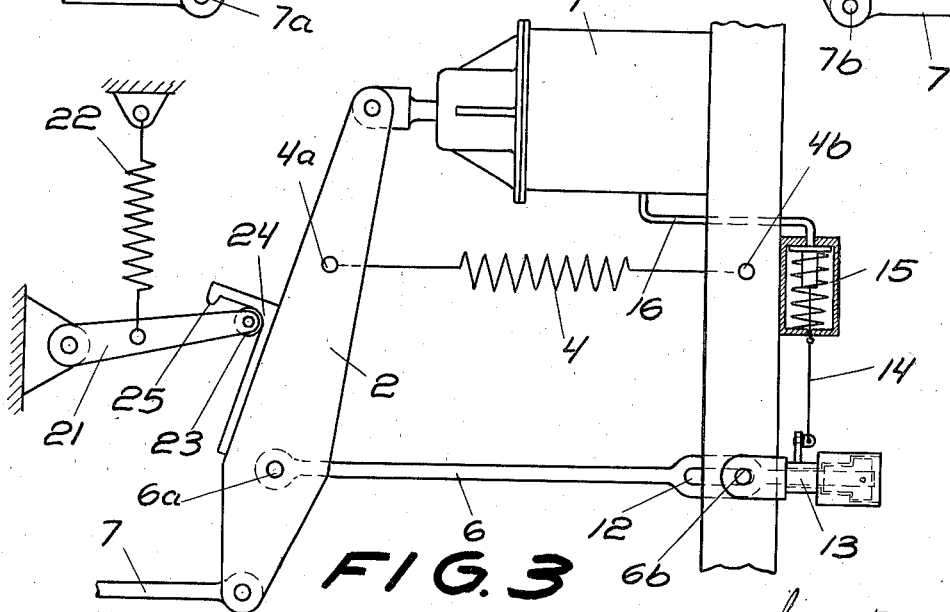

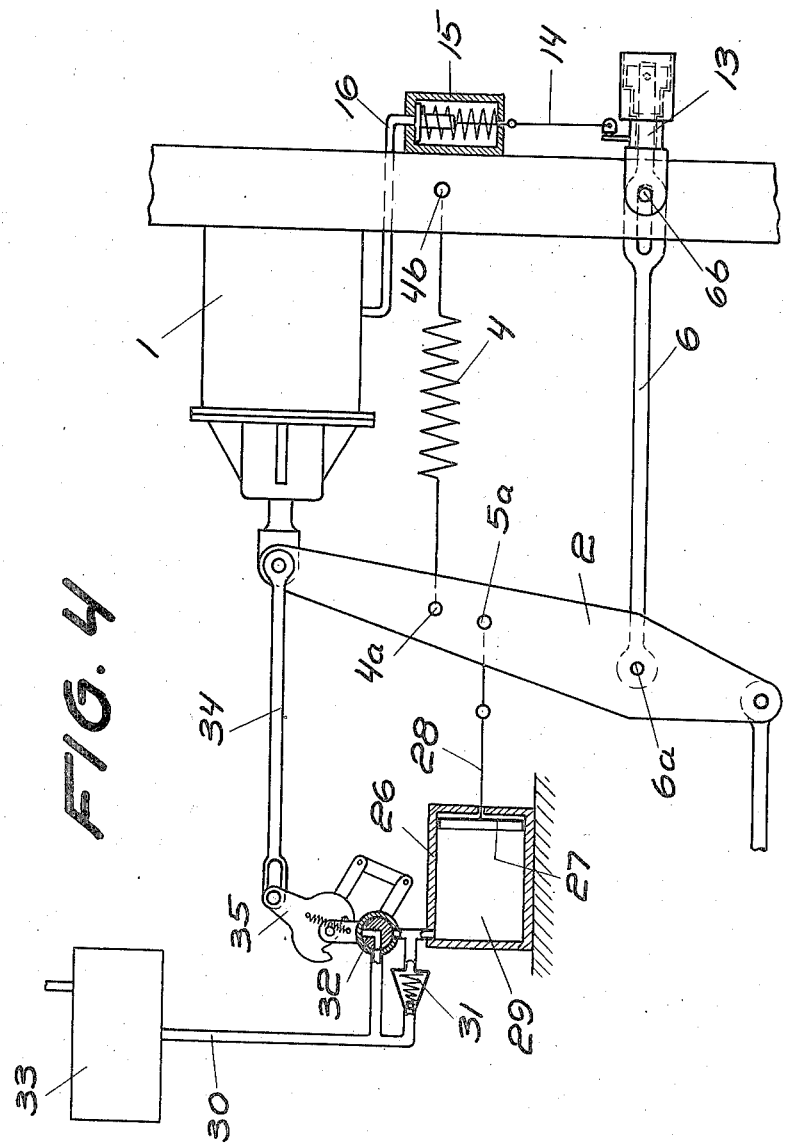

Patented Aug. 5, 1941

2,251,267

UNITED STATES PATENT OFFICE 2,251,267

VARIABLE LEVERAGE BRAKE

Axel Georg Hjalmar Carlbom, Malmo, Sweden, assignor to Svenska Aktiebolaget Bromsregulator, Malmo, Sweden, a corporation of Sweden Application April 4, 1940, Serial No. 327,925
In Germany April 4, 1939

9 Claims. (Cl. 188—198)

This invention relates to variable leverage brakes and more particularly to air brakes for railway vehicles and the like, of the type in which provision is made for a low leverage ratio which is effective only during the part of the brake piston stroke required for consuming and producing brake shoe clearance at application and release of the brake, respectively, and a higher leverage ratio which is effective during the part of the brake piston stroke necessary for producing the desired brake pressure.

The chief object of the invention is to obtain in brakes of this type as large a brake shoe clearance as possible at a given length of the brake piston stroke.

Other objects and advantages will occur in the course of this specification, and with all of said objects and advantages in view, the invention consists in the several novel features of construction, arrangement and combination of parts hereinafter fully set forth and claimed.

The invention is illustrated by way of examples in the accompanying drawings in which:

Figs. 1, 2, 3 and 4 are plan views, partly in section, of four different forms of brake arrangement according to the invention.

Referring to the drawings, Fig. 1 illustrates a form of the invention applied to a conventional type of brake rigging comprising a brake cylinder 1 having a brake piston, a live brake lever 2 pivoted to the brake piston head at 1a, a dead brake lever 3 pivoted to the brake cylinder 1 at 1b, a return spring 4 connected between the brake levers 2 and 3 at 4a and 4b, respectively, a tie rod 5 determining a lower leverage ratio, which interconnects the brake levers 2 and 3 at the points 5a and 5b, respectively, a second tie rod 6 determining a higher leverage ratio, which interconnects the brake levers 2 and 3 at the points 6a and 6b, respectively, and main brake pull rods 7 which are connected to the brake levers 2 and 3 at 7a and 7b, respectively, and extend towards the opposite ends of the vehicle for the actuation of the brake shoes. The tie rod 5 determining the lower leverage ratio is active during the part of the brake piston stroke serving to consume and produce the requisite brake shoe clearance at application and release of the brake, respectively. The tie rod 6 determining the higher brake applying leverage is active during the part of the brake piston stroke developing the brake pressure proper at a braking operation.

The tie rod 5 has one of its ends linked to the dead brake lever 3 at 5b without any lost motion, and at the other end the tie rod 5 is extended beyond the live brake lever 2 and linked at 8a to a supporting arm 8 which is pivoted to the live brake lever 2 at 5a. In the normal position shown the point 8a is slightly displaced to one side of a straight line drawn through the connection points 5a and 5b, but the arm 8 is prevented from being swung further to this side, in that the tie rod 5 extends beyond the connection point 5a at the opposite side of the said line and can support itself laterally against the pivot pin or bolt forming the said connection point 5a. At or near its extended end the tie rod 5 is connected by means of a link 9 to one arm of a bell crank lever 10 pivoted to the brake piston head at 1a. The other arm of said lever 10 is provided with a pin 10a or the like movable within limits in a slot 11a in an arm 11 pivoted on the brake cylinder 1. The tie rod 6 has a slot 12 or the like for providing a lost motion of the said tie rod in relation to the dead brake lever 3, and further the tie rod 6 is provided with a device 13, for instance in the form of a rotatable sleeve provided with abutments, by which the said lost motion can be reduced. Since the construction of the device 13 forms no part of the invention and is well known in the art, for instance from the U. S. Patent No. 2,171,392, it is not shown or described in detail herein. The device 13 is operatively connected by means of a link and lever connection 14 to a compressed air operated servo motor 15 connected by means of a conduit 16 to the brake cylinder 1 at a certain point thereof, so that the servo motor 15 receives compressed air from the brake cylinder 1 at each braking operation as soon as the brake piston passes the said point at which the conduit 16 is connected to the brake cylinder.

The operation of the brake arrangement now described is as follows:—

The parts are shown in their normal position, that is the position at released brake. Starting from this position at a braking operation, the leverage ratio of the brake levers 2 and 3 during the first part of the brake piston stroke, required for consuming the brake shoe clearance, that is for moving the brake shoes over said clearance into abutting contact with the wheels, is determined by the tie rod 5, in that this tie rod and the arm 8 during this first part of brake piston stroke work as a non-yielding supporting connection between the points 5a and 5b. At this movement for consuming the brake shoe clearance the tie rod 6 performs a lost motion in relation to its connection point 6b to the brake lever 3, such lost motion being permitted by the slot 12, and the pin 10a of the lever 10 performs a lost motion in relation to the arm 11 due to the slot 11a therein. In a certain position of the brake piston stroke the pin 10a of the lever 10 reaches the outer end of the slot 11a in the arm 11, whereby further lost motion of the pin 10a in relation to the arm 11 is stopped, so that at the continued travel of the brake piston the lever 10 is rotated and by means of the link 9 moves the tie rod 5 with the point 8a to the other side of the straight line defined by the points 5a and 5b. By this lateral movement of the tie rod 5 the brake levers 2 and 3 are deprived of their mutual support in the points 5a and 5b by the supporting arm 8 being rendered inactive. At the same time the brake piston has passed the connection of the conduit 16 to the brake cylinder 1, so that the servo motor 15 has received compressed air from the brake cylinder 1 and moved the device 13 into position for reducing the lost motion of the tie rod 6 in relation to its connection point 6b to the brake lever 3, which lost motion allowed the tie rod 6 to move idly during the brake shoe clearance consuming part of the brake piston stroke. Thus the mutual support of the brake levers 2 and 3 will be overtaken by the tie rod 6 in practically the same moment in which the supporting arm 8 for the tie rod 5 is rendered inactive.

As an aid in explaining the principal features of the invention, and the results and advantages obtained thereby, it may be mentioned that in air brakes the brake piston stroke must attain exactly or nearly a given value at each full application of the brake so that the brake shoe clearance will be the smaller the greater the leverage ratio of the brake lever or levers is chosen. Sometimes a very high brake applying leverage ratio is chosen for obtaining a correspondingly high brake pressure, and in order that this may not result in a correspondingly small brake shoe clearance it is known in the art to make provision for supporting the brake lever or each of the brake levers in a point determining a lower leverage ratio, which is active only under the part of the piston stroke required for consuming and producing the brake shoe clearance at application and release of the brake, respectively. Hitherto, for instance in a brake rigging of the conventional type illustrated in Fig. 1, the support for the brake levers 2, 3 in the points 5a, 5b determining the lower leverage ratio was by means of a supporting rod or the like having a lost motion connection with one or both of the said points 5a, 5b, and this rod or the like was active at each braking operation only as long as the return spring 4 for the brake levers did not yield to the resistance against the movement of the brake rigging. The return spring had to be designed so as to be capable of withstanding all the resistance against the idle movement of the brake rigging in order not to yield until the brake shoes had been moved into abutting contact with the wheels by such idle movement. Due to yielding of the return spring to the arising braking stress in the brake rigging at the continued travel of the brake piston the brake levers 2, 3 changed their fulcrums from the low leverage supporting rod, due to the lost motion provided for the latter, first to the connection points 7a, 7b for the main brake pull rods 7 and subsequently to the connection points 6a, 6b for the supporting rod 6 determining the higher leverage ratio, the movement taking place under yielding of the return spring being utilized for operating the device 13 for rendering the high leverage supporting rod 6 active. Thus, the part of the brake piston stroke corresponding to the movement for rendering the high leverage supporting rod active was not utilized for the purpose of consuming brake shoe clearance at application of the brake but was lost for that purpose, and likewise the corresponding part of the return stroke of the brake piston at release of the brake was lost for the purpose of producing brake shoe clearance. Further, a sudden and considerable increase of the reaction of the return spring on the brake piston occurred in the moment the brake levers 2, 3 changed their fulcrums from the points 5a, 5b determining the lower leverage ratio to the connection points 7a, 7b, for the brake pull rods 7. This considerable increase of the return spring reaction on the brake piston was disadvantageous especially for the reason that due to the same the brake piston might encounter a resistance sufficient for allowing the air pressure on the brake piston in the brake cylinder to rise to the predetermined value at which as is well known in the art, the air supply to the brake cylinder is automatically reduced. This reduction of the air supply to the brake cylinder is intended to take place only as a result of the increased resistance which the brake piston encounters after the brake shoes have been moved into abutting contact with the wheels, but there was a risk that the reduction might take place at an earlier moment due to the aforesaid sudden and considerable increase of the return spring reaction on the brake piston, should the brake shoe clearance exceed its normal value. If the reduction of the air supply to the brake cylinder takes place too early at a braking operation the final movement of the brake shoes into contact with the wheels is retarded, and this results in a disadvantageous retardation of the braking action.

In the present invention, at application of the brake, practically no part of the brake piston stroke up to the moment in which the high leverage ratio is rendered active, is lost for the purpose of consuming brake shoe clearance at the rate determined by the low leverage ratio, and likewise, at release of the brake, practically no part of the return stroke of the brake piston from the moment in which the high leverage ratio is again rendered inactive, is lost for the purpose of producing brake shoe clearance at the rate determined by the low leverage ratio. The result is that the brake shoe clearance at released brake will be as large as ever possible at the given length of the brake piston stroke at a full application of the brake. This is important for the reason that a brake shoe clearance as large as ever possible is desirable in order to avoid sliding of the brake shoes on the wheels at released brake. A further result of the present invention is that only a moderate increase of the return spring reaction on the brake piston occurs when the supporting rod 5 determining the lower leverage ratio is rendered inactive. Both these results of the invention are obtained principally due to the fact that at application of the brake the means for supporting the brake lever in the point determining the higher leverage ratio is ready to overtake the support of the brake lever in practically the same moment in which the brake lever is deprived of its support in the point determining the lower leverage ratio, and that conversely at release of the brake the means for supporting the brake lever in the point determining the lower leverage ratio is ready for overtaking the support of the brake lever in practically the same moment in which the brake lever is deprived of its support in the point determining the higher leverage ratio. According to the invention this functioning is made possible principally by the use of a supporting member, such as the supporting arm 8 in the form of the invention illustrated in Fig. 1, which, when active, affords or intermediates a positive support to the brake lever in the point determining the lower leverage ratio, and which is movable in and out of active position under the control of the brake piston travel and thus works independently of the action of the return spring and of the resistance against the movement of the brake rigging. The invention is further principally characterized by the fact that also the means, such as the device 13 in the form of the invention illustrated in Fig. 1, for setting the member (tie rod 6 in Fig. 1) for supporting the brake lever in the point determining the higher leverage ratio in and out of active position, is controlled in dependence on the brake piston travel and thus works independently of the action of the return spring and of the resistance to the movement of the brake rigging.

The form of the invention illustrated in Fig. 2 differs from that of Fig. 1 only by a somewhat different construction of the movable supporting member connecting the tie rod 5 to the brake lever 2, and of the means for actuating the bell crank lever 10. The end of the tie rod 5 extending beyond the brake lever 2 is connected at 17a to a supporting arm 17 pivoted to the brake lever 2 in the point 5a and provided with an extension 18. The arrangement is such that the rod 5 when stressed tends to swing the arm 17 out of its shown normal and active position. The lever 10 to which the point 17a of the arm 17 is connected by means of the link 9, is adapted to coact with a fixed abutment 20, and until at application of the brake the lever 10 reaches the abutment 20 and at the continued travel of the brake piston is rotated and through the link 9 swings the arm 17 out of its active position, the arm 17 is held in this position by a spring device 19 against the action of any pulling stress arising in the rod 5. This spring device 19 exerts a pressure on the extension 18 and is connected between the latter and preferably the point 7a. When the arm 17 is swung by the lever 10 and link 9 the moment of the pulling force exerted by the rod 5 on the arm 17 increases so materially in relation to the moment of the spring pressure on the extension 18 that this spring pressure is easily overcome. The use of the spring device 19 has the advantage of smoothing off the operation of the mechanism in changing over from the lower to the higher leverage ratio.

Fig. 3 illustrates a form of the invention applied to a brake arrangement having a single brake lever 2. The point 6a determining the higher leverage ratio is connected by means of the tie rod 6 to the point 6b which in this case takes a fixed position in relation to the frame of the vehicle. The tie rod 6 is provided with the slot 12 for lost motion in relation to the point 6b, and also with the device 13 for reducing this lost motion, the device 13 being under the control of the means 14, 15, 16 as in the previously described forms of the invention. The return spring 4 connects the point 4a on the lever 2 to the point 4b which in this case similarly to the point 6b takes a fixed position in relation to the vehicle frame. For producing the lower leverage ratio active during the brake shoe clearance consuming and producing part of the brake piston stroke at application and release of the brake, respectively, there is provided a supporting arm 21 pivoted at a point fixed in relation to the vehicle frame. The arm 21 is acted upon by a spring 22 and is provided at its free end with a roller 23. Normally the arm 21 under the action of the spring 22 takes a position with the roller 23 in the corner between the legs of an angle-formed member 24 secured on the brake lever 2, so that at application of the brake the roller 23 serves as a fulcrum for the brake lever 2 until in a certain position of the brake piston stroke an abutment 25 on the member 24 comes in contact with the arm 21 and at the continued travel of the brake piston swings the arm 21 against the action of the spring 22 away from the corner between the legs of the member 24. As the arm 21 is thus swung the brake lever 2 is deprived of its support in the point (the corner between the legs of the member 24) determining the lower leverage ratio, and the support of the brake lever 2 is overtaken by the tie rod 6 in the point 6a determining the higher leverage ratio.

The form of the invention illustrated in Fig. 4 differs from that of Fig. 3 by the provision of a hydraulic cylinder 26 with a piston 27 and piston rod 28 for the support of the brake lever 2 in the point 5a determining the lower leverage ratio. The space 29 behind the piston 27 in the cylinder 26 is connected by means of a conduit 30, and two valves 31 and 32 connected in parallel therein, to a reservoir 33 for a suitable fluid. The valve 31 is a check valve and the valve 32 is a shut off valve which is under the control of the brake piston travel and to this end is operatively connected to the brake piston head by the intermediary of a rod 34 and a tumble-lever 35. Normally the valve 32 is closed, and it is opened when at a braking operation the brake piston reaches a certain position. Normally the piston 27 in the cylinder 26 takes the position shown, and so long as the valve 32 is closed the piston 27 is held in this position by the fluid enclosed in the space 29, so that the piston 27 through its rod 28 supports the brake lever 2 in the point 5a until the valve 32 is opened and allows the fluid in the cylinder 26 to escape to the reservoir 33 under the pressure exerted thereon by the piston 27. This occurs when the brake piston has travelled the distance corresponding to the brake shoe clearance and results in the piston 27 and, consequently, the point 5a of the brake lever 2 being deprived of their support by the fluid in the cylinder 26, so that the piston 27 is moved to the left in the drawings, whereby the support of the brake lever 2 will be overtaken by the tie rod 6 in the point 6b determining the higher leverage ratio. At the following release of the brake the piston 27 is moved back again into its normal position under return of fluid to the cylinder 26 either through the valve 32 or, after the valve 32 has been closed again by the operative connection with the brake piston head, through the valve 31.

What I claim and desire to secure by Letters Patent is:

1. A variable leverage brake of the character described, comprising a brake actuator, a brake lever operable by said brake actuator, a lost motion tie rod connected to said brake lever in a point determining a relatively high leverage ratio, a device for reducing the lost motion of said tie rod for rendering it operative for supporting said brake lever in said high leverage point, means operable under the control of said brake actuator for setting said device into an active position for rendering said tie rod operative and out of such position for rendering said tie rod inoperative as soon as said brake actuator passes a predetermined position at application and release of the brake, respectively, and means movable under the control of said brake actuator into an active position for affording support to said brake lever in a point determining a relatively low leverage ratio as soon as said brake actuator reaches said predetermined position during release of the brake, and out of such position for depriving said brake lever of its support in said low leverage point as soon as said brake actuator reaches said predetermined position during application of the brake.

2. A variable leverage brake of the character described, comprising a brake actuator, a brake lever operable by said brake actuator, a lost motion tie rod connected to said brake lever in a point determining a relatively high leverage ratio, a device for reducing the lost motion of said tie rod for rendering it operative for supporting said brake lever in said high leverage point, means operable under the control of said brake actuator for setting said device into an active position for rendering said tie rod operative and out of such position for rendering said tie rod inoperative as soon as said brake actuator passes a predetermined position at application and release of the brake, respectively, and means comprising an arm swingable under the control of the movement of said brake actuator into an active position for affording support to said brake lever in a point determining a relatively low leverage ratio as soon as said brake actuator reaches said predetermined position during release of the brake, and out of such position for depriving said brake lever of its support in said low leverage point as soon as said brake actuator reaches said predetermined position during application of the brake.

3. A variable leverage brake as claimed in claim 1, in which said means for affording support to said brake lever in said low leverage point comprises a hydraulic cylinder, a piston in said cylinder, means connecting said piston to said brake lever in said low leverage point, means for supplying fluid to said cylinder behind said cylinder, whereby said piston may support said brake lever for action in said low leverage point, and valve means operable by the movement of said brake actuator for controlling escape of fluid from said cylinder.

4. A variable leverage brake as claimed in claim 2, in which said swingable arm is pivoted to said brake lever in said low leverage point.

5. A variable leverage brake as claimed in claim 2, in which said means including said swingable arm also includes a tie rod knee-jointed to said brake lever in said low leverage point by the intermediary of said swingable arm.

6. A variable leverage brake as claimed in claim 2, in which said means including said swingable arm also includes a tie rod knee-jointed to said brake lever in said low leverage point by the intermediary of said swingable arm, and a spring device biassing said swingable arm into the active position, the arrangement being such that after said swingable arm having been swung slightly out of the active position under the control of the movement of said brake actuator at an application of the brake, the action of said spring device on said swingable arm will be easily overcome by the action of the stress arising in said last mentioned tie rod at the braking operation.

7. A variable leverage brake as claimed in claim 2, in which said swingable arm is pivoted in a fixed point.

8. A variable leverage brake as claimed in claim 2, in which said swingable arm is pivoted at a fixed point and is biassed into the active position and in the latter with its free end supports said brake lever in said low leverage point, and in which an abutment is provided on said brake lever for swinging said swingable arm out of the active position.

9. A variable leverage brake of the character described, comprising a brake actuator, a brake lever operable by said brake actuator, means controllable by the movement of said brake actuator for supporting said brake lever in a point determining a relatively low leverage ratio until at a braking operation the application movement of said brake actuator reaches a predetermined position, said means comprising an hydraulic cylinder, a piston in said cylinder, means connecting said piston to said brake lever in said first point, means for supplying fluid to said cylinder behind said piston, whereby the piston may support said brake lever for action in said first point, and valve means operable by the movement of said brake actuator for controlling escape of fluid from said cylinder, and means ready to afford support to said brake lever in another point determining a higher leverage ratio as soon as said brake lever loses its support in said first point due to escape of fluid from said cylinder.

AXEL GEORG HJALMAR CARLBOM.